United States Patent
Wakino et al.

(10) Patent No.: US 8,931,586 B2
(45) Date of Patent: Jan. 13, 2015

(54) WORKING VEHICLE

(71) Applicant: Iseki & Co., Ltd., Ehime-ken (JP)

(72) Inventors: Takashi Wakino, Ehime-ken (JP);
Tomoo Kiyokawa, Ehime-ken (JP);
Satoru Kinoshita, Ehime-ken (JP);
Noboru Sagawa, Ehime-ken (JP);
Takanori Izutani, Ehime-ken (JP)

(73) Assignee: Iseki & Co., Ltd., Ehime-Ken (JP)

( * ) Notice: Subject to any disclaimer, the term of this patent is extended or adjusted under 35 U.S.C. 154(b) by 0 days.

(21) Appl. No.: 13/953,063

(22) Filed: Jul. 29, 2013

(65) Prior Publication Data

US 2014/0056676 A1    Feb. 27, 2014

(30) Foreign Application Priority Data

Aug. 21, 2012 (JP) .................................. 2012-182216

(51) Int. Cl.
| | | |
|---|---|---|
| *B60K 23/00* | (2006.01) | |
| *E02F 3/43* | (2006.01) | |
| *E02F 9/16* | (2006.01) | |
| *E02F 9/20* | (2006.01) | |
| *B62D 33/06* | (2006.01) | |
| *B62D 33/073* | (2006.01) | |
| *B62D 49/02* | (2006.01) | |

(52) U.S. Cl.
CPC . *E02F 3/431* (2013.01); *E02F 9/16* (2013.01); *E02F 9/2004* (2013.01); *B62D 33/0617* (2013.01); *B62D 33/073* (2013.01); *B62D 49/02* (2013.01)
USPC ............ 180/315; 180/334; 180/336; 414/694

(58) Field of Classification Search
CPC ......... E02F 3/431; E02F 9/2004; B60K 23/00
USPC .......................... 180/315, 334, 336; 414/694
See application file for complete search history.

(56) References Cited

U.S. PATENT DOCUMENTS

| 4,450,927 A | 5/1984 | Hirata et al. | |
|---|---|---|---|
| 6,612,636 B2 * | 9/2003 | Arthur et al. .................... | 296/71 |

(Continued)

FOREIGN PATENT DOCUMENTS

| FR | 2816727 | | 5/2002 |
|---|---|---|---|
| JP | 2008037411 A | * | 2/2008 |

(Continued)

OTHER PUBLICATIONS

Hanano et al., Mechanical excavator drive control system, has a movable control box to enable driver to enter and descend from the vehicles cab, May 17, 2002, French Patent Office, FR 2 816 727 A1, English Abstract.*

(Continued)

*Primary Examiner* — James English
(74) *Attorney, Agent, or Firm* — Wenderoth, Lind & Ponack, L.L.P.

(57) ABSTRACT

A working vehicle includes a joy-stick lever which operates a front loader, and a main change lever etc., wherein a right side dashboard is located in the right side of the driver's seat, the forward end step part is located beside the steering wheel, and is provided with the joy-stick lever, a grip part of the main change lever is disposed at a lower position than the steering wheel, a grip part of the position lever is disposed at an outside position of the grip part of the main change lever on a plan view, and a grip part of the joy-stick lever is disposed at a front side position of the grip part of the main change lever on a plan view, and is disposed in a range of a height of the steering wheel on a side view.

2 Claims, 10 Drawing Sheets

(56) References Cited

U.S. PATENT DOCUMENTS

| | | | |
|---|---|---|---|
| 6,634,453 B2 * | 10/2003 | Arthur et al. | 180/315 |
| 7,438,517 B2 * | 10/2008 | Tanaka et al. | 414/680 |
| 7,857,090 B2 * | 12/2010 | Ruhter et al. | 180/333 |
| 8,424,632 B2 * | 4/2013 | Ruhter et al. | 180/320 |
| 8,434,562 B2 * | 5/2013 | Miyasaka et al. | 172/431 |
| 2007/0020068 A1 | 1/2007 | Tanaka et al. | |
| 2014/0076103 A1 * | 3/2014 | Sagawa et al. | 74/665 F |

FOREIGN PATENT DOCUMENTS

| | | |
|---|---|---|
| JP | 2009-15374 | 1/2009 |
| JP | 4447516 | 4/2010 |

OTHER PUBLICATIONS

Hanano et al., Mechanical excavator drive control system, has a movable control box to enable driver to enter and descend from the vehicles cab, May 17, 2002, French Patent Office, FR 2 816 727 A1, Machine Translation of Description.*

Komoda et al., Operation Device for Tractor, Feb. 21, 2008, JPO, JP 2008-37411 A, English Abstract.*

Komoda et al., Operation Device for Tractor, Feb. 21, 2008, JPO, JP 2008-37411 A, Machine Translation of Description.*

Extended European Search Report issued Nov. 20, 2013 in corresponding European Application No. 13 17 8547.

* cited by examiner

WORKING VEHICLE

BACKGROUND OF THE INVENTION

1. Field of the Invention

The present invention relates to a working vehicle, to which a loader is attached, for an agriculture use, a construction use, a transportation use and the like.

2. Related Art of the Invention

Conventionally, a working vehicle such as a tractor is known, a work implement such as a front loader is attached to a front portion of a vehicle body of the working vehicle, and a loader lever for operating the front loader is located in the position where an operator driving the working vehicle can touch it by hand.

A working vehicle, which is provided with the loader lever at the position that does not interfere with the getting on and off of the vehicle's operator, is proposed by a patent document of Japanese Patent No. 4447516.

FIG. 9 is a whole right side view seen from the right side of the loader-working vehicle 100, which is proposed by the patent document of Japanese Patent No. 4447516. And FIG. 10 is a left side view seen from the left side of the inside of a cabin of the loader-working vehicle 100.

In the front side of the loader-working vehicle, a front loader 104 is attached to a pair of masts 109 which are fixed to right and left sides of the vehicle body.

The front loader 104 is provided with a pair of right and left side frames 101 which are fixed to each one of the right and left masts 109, a pair of right and left booms 102 which are connected to the upper portions of the side frames 101 by pivots in such a manner that the booms 102 can be swung vertically, and a bucket 103 which is connected to the tip portions of the pair of right and left booms 102 by pivots in such a manner that the bucket 103 can be swung vertically.

A control valve 107 which controls cylinders that make the booms 102 and the bucket 103 swing is disposed at the lower end side of the right side mast 109.

The control valve 107 is interlocked to a loader lever 118 which is disposed above a main change lever 122 by an interlocking unit having wire and the like, and is constructed in such a manner that the swing control of the booms 102 and the bucket 103 can be operated by remote control when the operator operates the loader lever 118 in the state where the operator is sitting on the driver's seat.

As shown in FIG. 10, the vertical wall part 120 is installed in a standing manner at the right-hand side of the driver's seat, a sub-change lever 121 is disposed at the forehand part side on the upper surface of the vertical wall part 120, and a main change lever 122 is disposed at the slanting back position on the right-hand side of the sub-change lever 121.

A base part of the loader lever 118 is fixed to the forehand part of the vertical wall part 120.

When the operator gets on and off the working vehicle through the right side thereof, a space between the vertical wall part 120 and a steering wheel 111 is used as a passage for getting on and off. Since the loader lever 118 is disposed at the forehand part of the vertical wall part 120, the loader lever 118 does not interfere with the getting on and off by the vehicle's operator.

SUMMARY OF THE INVENTION

Problems to be Solved by the Invention

In the case of the conventional loader-working vehicle 100 disclosed by the patent document of Japanese Patent No. 4447516, however, it was hard to operate the front loader 104 during driving of the vehicle.

That is to say, in the case of the configuration of the conventional loader-working vehicle 100 shown in FIG. 10, the loader lever 118 is disposed in the front side position of the main change lever 122 and is disposed in the position above the main change lever 122 and the sub-change lever 121. By this configuration, a grip part of the loader lever 118 is located above in comparison with the steering wheel 111.

Since the grip part of the loader lever 118 is located at a higher place than the steering wheel 111 and is located at the position remote from the steering wheel 111, it is hard for the operator to operate the loader lever 118 when the operator drives the loader-working vehicle 100 using the steering wheel 111.

The present invention is directed to provide a working vehicle in which the operation of the front loader thereof is easier than the conventional working vehicle, even when the operator drives the working vehicle.

Means for Solving the Problems

To achieve the above described purpose of the present invention, the $1^{st}$ aspect of the present invention is a working vehicle, comprising:

a driver's seat;

a steering wheel;

a work implement lifting lever which performs operation for lifting or lowering a work implement;

a power takeoff (PTO) on-off member which turns on and off a PTO;

a loader lever which operates a loader; and a main change lever which changes running speed of the working vehicle, wherein an operation panel is located in one side of the driver's seat, a step part is located on a forehand side of the operation panel, the step part being lower than a top surface of the operation panel, the work implement lifting lever and the PTO on-off member are located on the operation panel, the step part is located beside the steering wheel, and is provided with the loader lever, the main change lever is located between the operation panel and the driver's seat, a grip part of the main change lever is disposed at a lower position than the steering wheel, a grip part of the work implement lifting lever is disposed at an outside position of the grip part of the main change lever on a plan view, and a grip part of the loader lever is disposed at a front side position of the grip part of the main change lever on a plan view, and is disposed in a range of a height of the steering wheel on a side view.

According to the working vehicle mentioned above, since the loader lever (30) is disposed in the position near the steering wheel (20), the operation of the loader (14) is easier than the conventional working vehicle, even when the operator drives the working vehicle while using the steering wheel (20).

It is easy for the driver sitting on the driver's seat (21) to perform the operation of the work implement and the operation of the loader (14) properly with reference to the main change lever (40).

The $2^{nd}$ aspect of the present invention is the working vehicle according to the $1^{st}$ aspect of the present invention, wherein the PTO on-off member is disposed on an upper part surface which is formed on an outside part of the top surface of the operation panel, and the work implement lifting lever is disposed on an lower part surface which is formed on an inside part of the top surface of the operation panel, the upper part surface being disposed on a position which is far from the driver's seat, in comparison with the lower part surface with respect to right and left direction of the working vehicle.

According to the working vehicle mentioned above, it is easy for the driver sitting on the driver's seat (21) to operate the work implement.

The 3$^{rd}$ aspect of the present invention is the working vehicle according to the 1$^{st}$ aspect of the present invention, wherein a lock member which locks an operation of the loader lever is disposed in front of and below the step part.

According to the working vehicle mentioned above, since the loader lever (30) can be locked when the operation of the loader lever (30) is unnecessary, it is possible to prevent the loader (14) from moving suddenly, even when the operator touches the loader lever (30) carelessly. Further, when the operator drives the working vehicle using the steering wheel (20), it is possible to prevent the operator from operating the lock member (28) mistakenly.

The 4$^{th}$ aspect of the present invention is the working vehicle according to the 2$^{nd}$ aspect of the present invention, wherein a lock member which locks an operation of the loader lever is disposed in front of and below the step part.

According to the working vehicle mentioned above, since the loader lever (30) can be locked when the operation of the loader lever (30) is unnecessary, it is possible to prevent the loader (14) from moving suddenly, even when the operator touches the loader lever (30) carelessly. Further, when the operator drives the working vehicle using the steering wheel (20), it is possible to prevent the operator from operating the lock member (28) mistakenly.

Advantageous Effects of Invention

According to the present invention, it is possible to provide a working vehicle in which the operation of the front loader thereof is easier than the conventional working vehicle, even when the operator drives the working vehicle.

PREFERRED EMBODIMENTS OF THE INVENTION

Hereinafter, a tractor for the agriculture use, which is one example of a working vehicle of the present invention, according to an embodiment of the present invention will be described with reference to the drawings.

Figure 1:
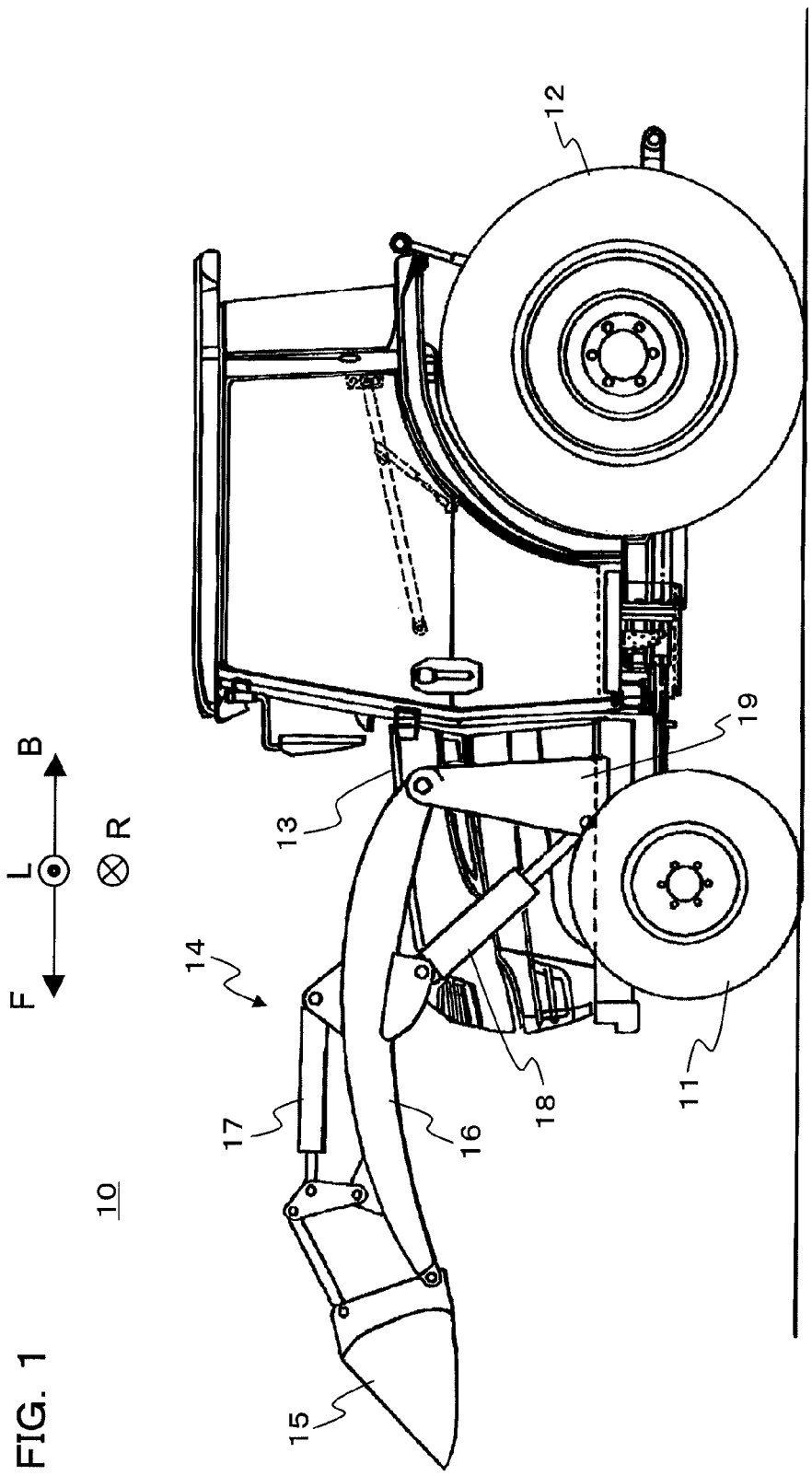
FIG. 1 is a left side view of a tractor for an agriculture use according to the Embodiment of the present invention.

By the way, in this specification and drawings, a front direction corresponds to a direction in which the tractor moves forward (for example, see the arrow F of FIG. 1), and a back direction corresponds to a direction in which the tractor moves backward (for example, see the arrow B of FIG. 1). And a left direction corresponds to a direction of the driver's left hand when the driver sits on the driver's seat of the tractor and faces toward the direction of the forward movement of the tractor (for example, see the arrow L of FIG. 2), and the right direction corresponds to a direction of the driver's right hand when the driver sits on the driver's seat of the tractor and faces toward the direction of the forward movement of the tractor (for example, see the arrow R of FIG. 2).

Figure 2:
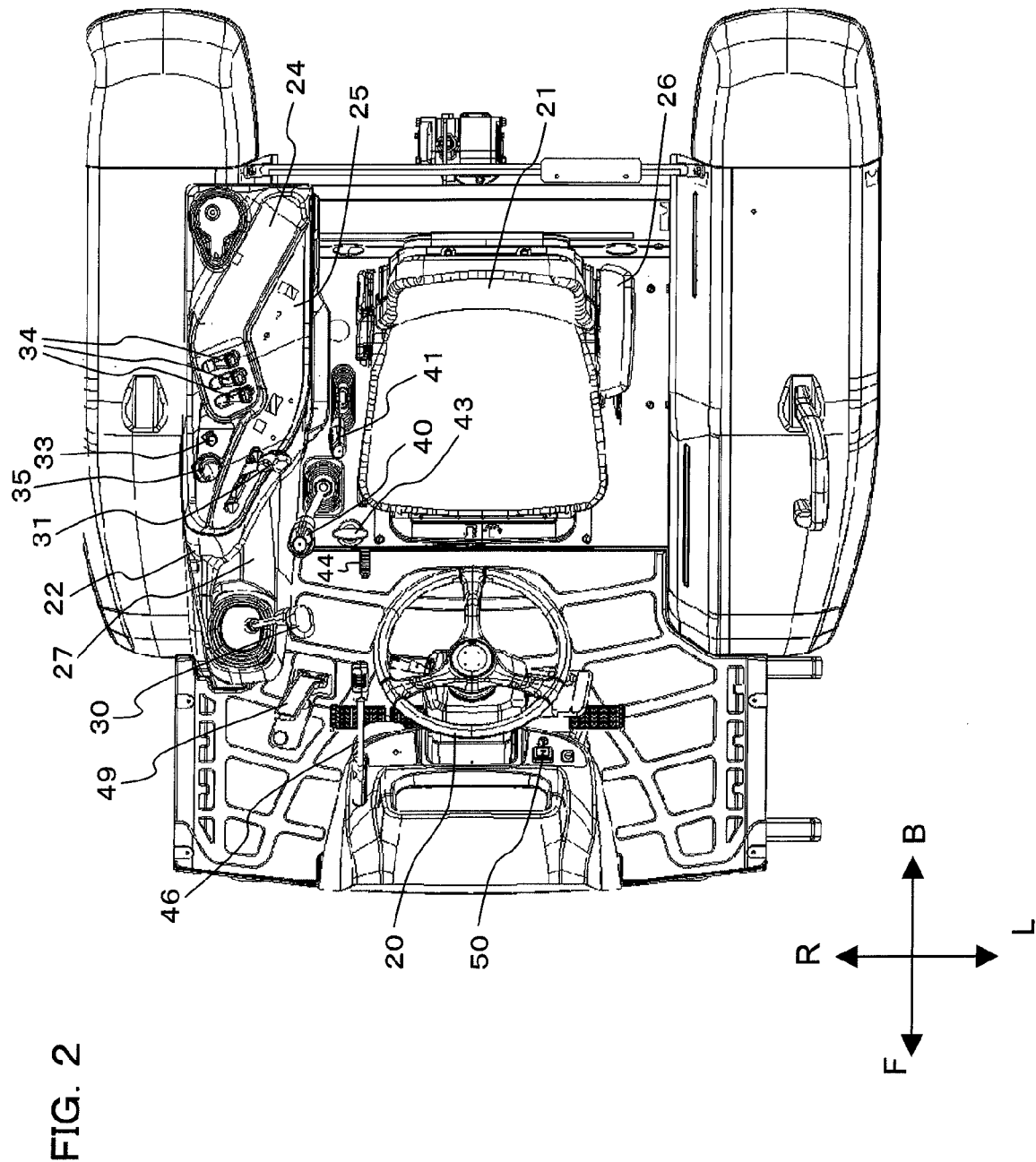
FIG. 2 is a plan view of a cabin of a tractor for the agriculture use according to the Embodiment of the present invention.
Figure 3:
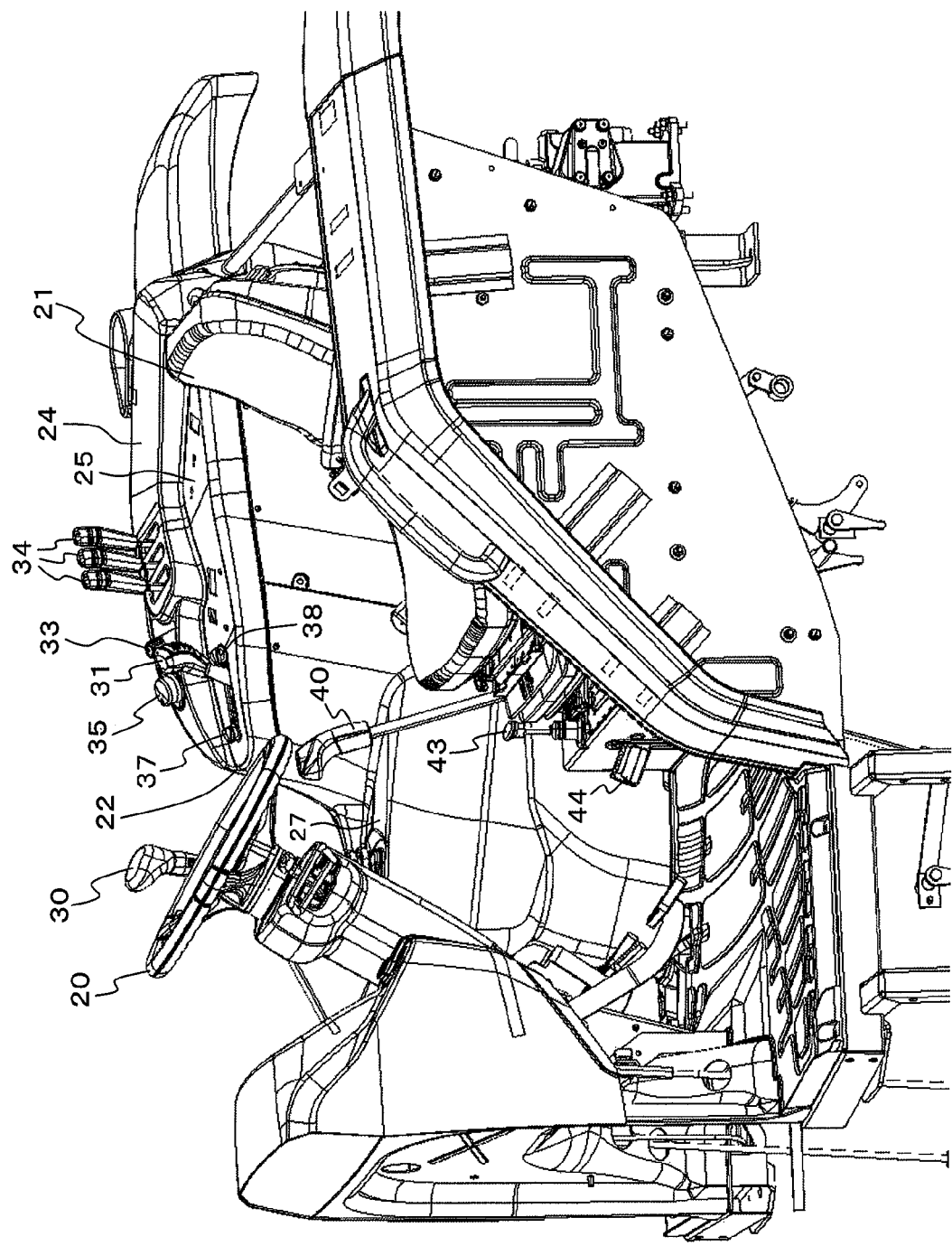
FIG. 3 is a perspective view seen from the left fore side of an inside of the cabin of the tractor for the agriculture use according to the Embodiment of the present invention.
Figure 4:
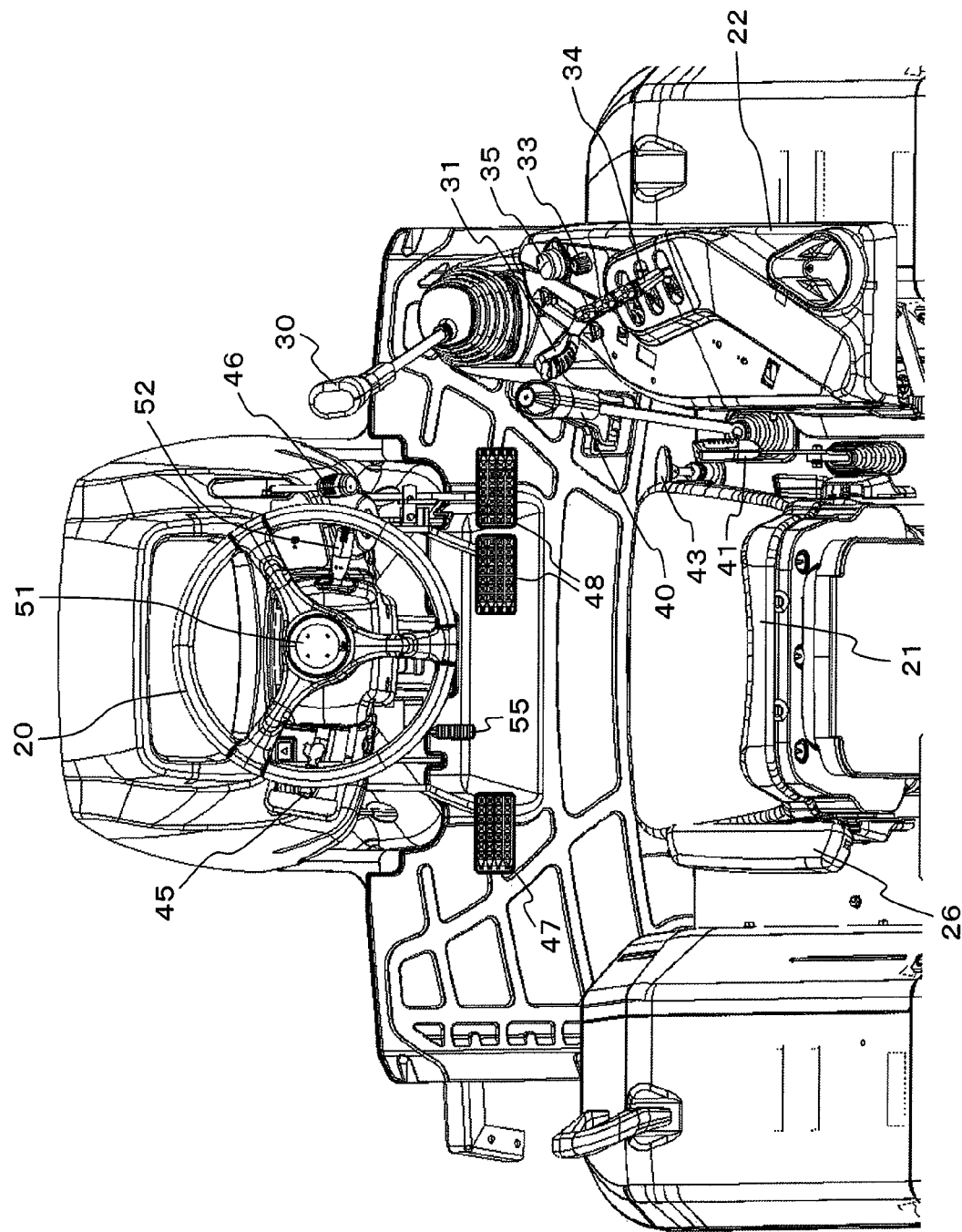
FIG. 4 is a perspective view seen from the back side of the inside of the cabin of the tractor for the agriculture use according to the Embodiment of the present invention.
Figure 5:
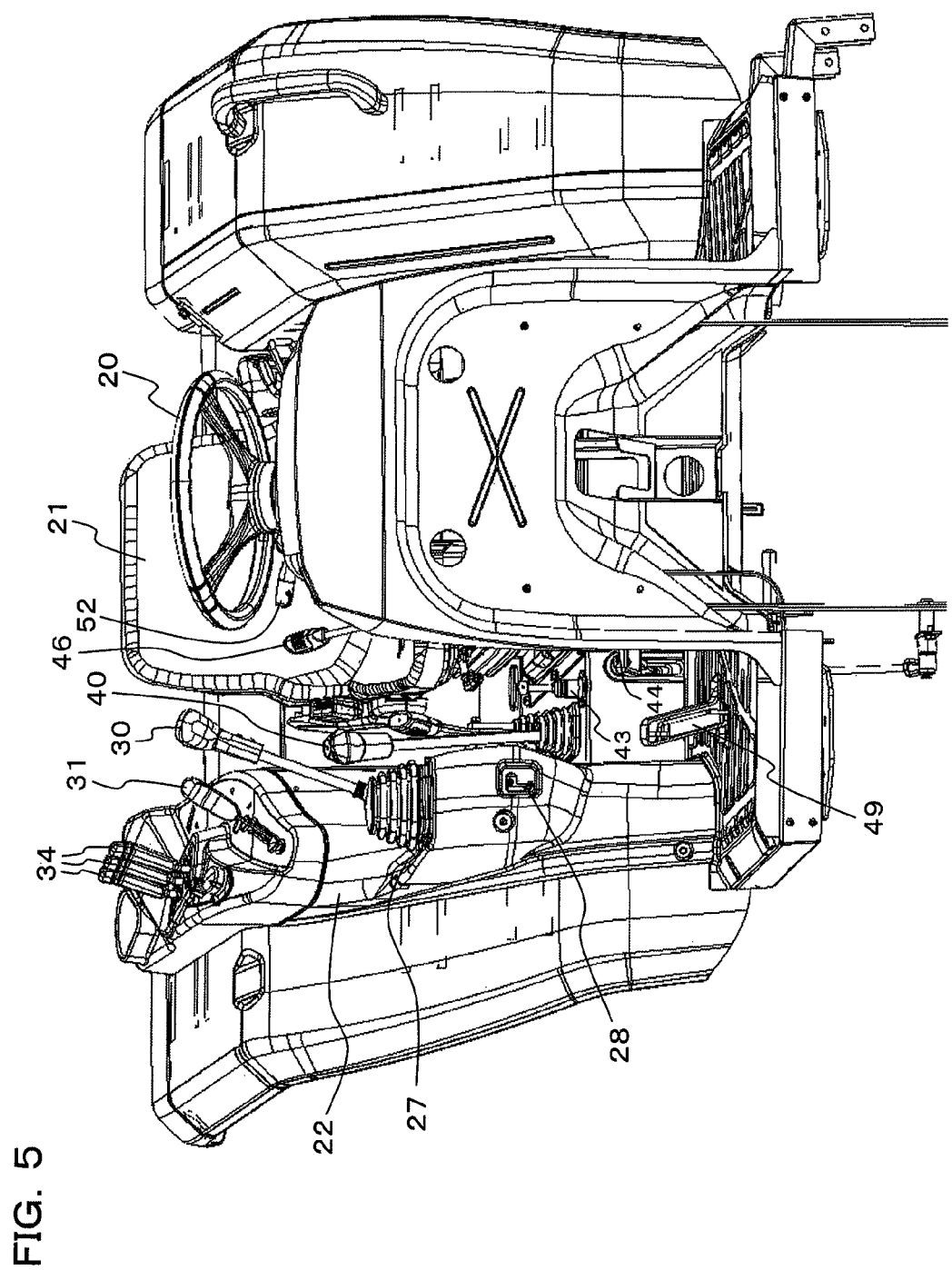
FIG. 5 is a perspective view seen from the front side of the inside of the cabin of the tractor for the agriculture use according to the Embodiment of the present invention.
Figure 6:
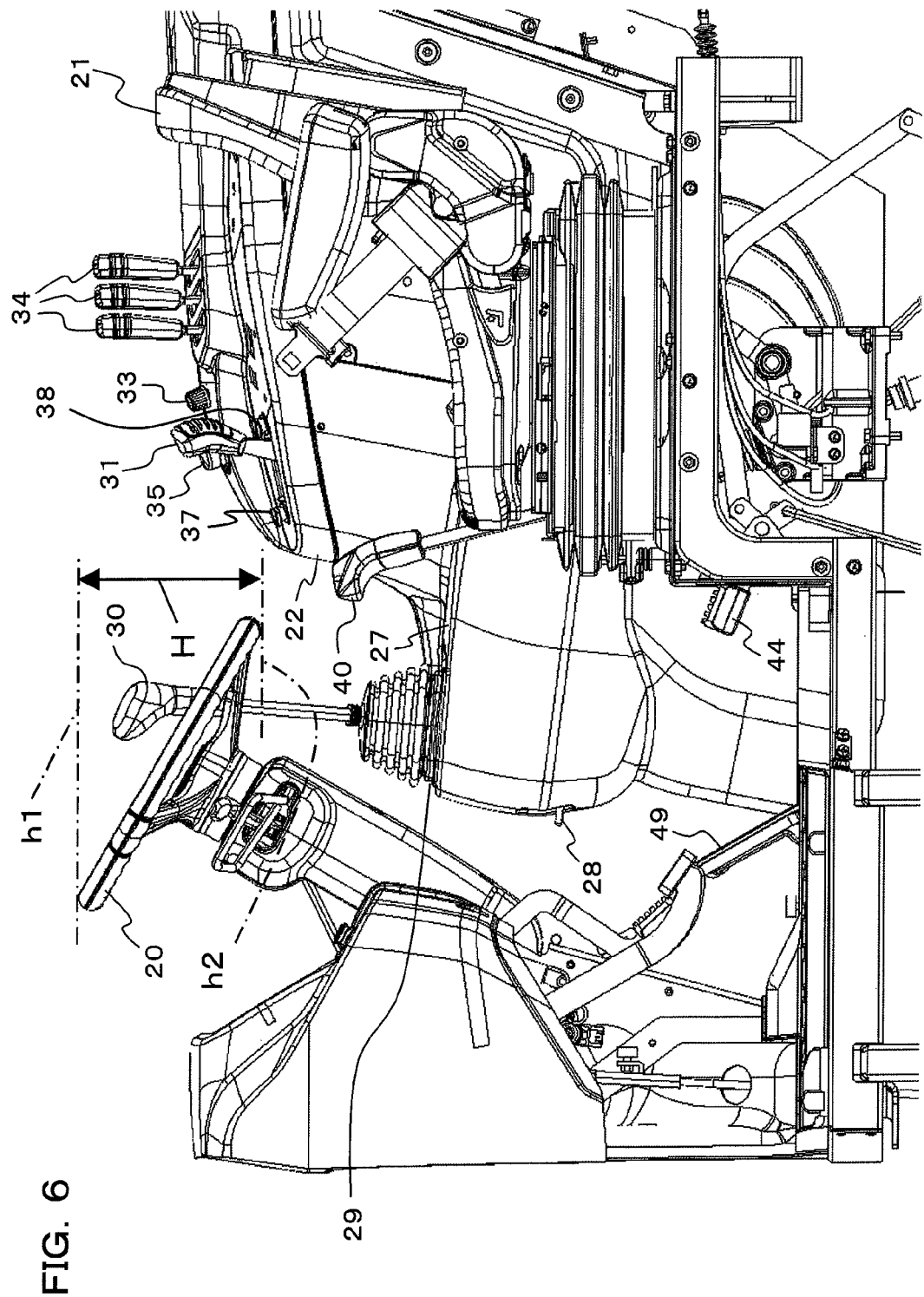
FIG. 6 is a side view seen from the left side of the inside of the cabin of the tractor for the agriculture use according to the Embodiment of the present invention.

FIG. 1 is a left side view of a tractor for an agriculture use according to the present Embodiment. FIG. 2 is a plan view of a cabin of a tractor for the agriculture use according to the present Embodiment. FIG. 3 is a perspective view seen from the left front of an inside of the cabin of the tractor for the agriculture use according to the present Embodiment. FIG. 4 is a perspective view seen from the back of the inside of the cabin of the tractor for the agriculture use according to the present Embodiment. FIG. 5 is a perspective view seen from the front of the inside of the cabin of the tractor for the agriculture use according to the present Embodiment. And FIG. 6 is a side view seen from the left front of the inside of the cabin of the tractor for the agriculture use according to the present Embodiment.

The tractor 10 of the present Embodiment, as shown in FIG. 1, is provided with a pair of right and left rear wheels for drive 12 in the rear portion of the vehicle body, and a pair of right and left front wheels 11, which are steered by a steering wheel 20, in the front portion of the vehicle body. The front part of the cabin, which encloses a driver's seat 21 provided with the steering wheel 20, is covered by a bonnet 13, and an engine, a radiator, an oil cooler, a condenser for air conditioning, an intercooler, an air cleaner, a battery and the like are put on in the inside of the bonnet.

As shown in FIG. 1, the tractor 10 is provided with a front loader 14 in front side of the vehicle body.

The front loader 14 is provided with a pair of right and left side frames 19 which are fixed to both sides of the vehicle body of the tractor 10, a pair of right and left main-frames 16 which are connected to the upper portions of the side frames 19 by pivots in such a manner that the main-frames 16 can be swung vertically, and a bucket 15 which is connected to the tip portions of the pair of right and left main-frames 16 by pivots in such a manner that the bucket 15 can be swung vertically.

A base part of the side frame 19 and a center part of the main-frame 16 are connected with a retractile cylinder for pivotable main frame, and a cylinder for pivotable bucket 17, which controls the pivotable operation of the bucket 15, is connected to the front upper side of the main-frame 16.

By the way, the tractor 10 is one example of the working vehicle of the present invention, and the front loader 14 is one example of the loader of the present invention.

The tractor 10 of the present Embodiment can work for the ground by mounting a work implement (not shown) such as a rotary tiller capable of being lifted up and down via a three-point hitch linkage which is disposed on the rear part of the vehicle body.

Next, arrangement of each tool for operation which is disposed in the cabin of the tractor 10 of the present Embodiment will be described.

The driver's seat 21 which is disposed on the center portion of the cabin is provided with an arm rest 26 on the left side thereof.

A step is located on a top portion of the right side dashboard 22, and the top portion has two almost level surfaces as an upper part surface 24 and a lower part surface 25. As shown in FIG. 3, the upper part surface 24 is formed on a rear and outside part on the top portion of the right side dashboard 22, the lower part surface 25 is formed on a fore and inside part on the top portion of the right side dashboard 22.

The operation tools to use when the working vehicle is operated are disposed on the upper part surface 24 and the lower part surface 25 intensively.

Three external oil pressure levers 34 are disposed on the upper part surface 24.

A position lever 31 is disposed on the front end part of the lower part surface 25, and a PTO on-off switch 35 and a depth control dial 33 are disposed on the upper part surface 24 near the outside of the position lever 31.

As shown in FIG. 3, an adjustment dial of descent limit position 37 is disposed on a front end part of a root portion of the position lever 31, and an adjustment dial of ascent limit position 38 is disposed on a rear end part of the root portion of the position lever 31.

The position lever 31 controls ascent operation and descent operation of the work implement, the position of the rear side corresponds to "ascent operation" and the position of the front side corresponds to "descent operation." When the steering wheel is turned to turn the vehicle body around, the work implement is raised. Since the adjustment dial of descent limit position 37 and the adjustment dial of ascent limit position 38 are constituted so that the movement range of the position lever 31 with respect to the fore and aft direction of the position lever 31 can be adjusted, it is possible to regulate the operation range of the work implement with respect to the up-and-down direction.

By the way, since the PTO on and off switch 35 is a dial type, even if the operator's body comes in contact with the PTO on and off switch 35, it does not malfunction.

The right side dashboard 22 is one example of an operation panel of the present invention. The position lever 31 is one example of a work implement lifting lever of the present invention, and the PTO on and off switch 35 is one example of a PTO on and off member of the present invention.

A forward end step part 27 as a step part is formed on the forward end part of the right side dashboard 22.

A loader lever fixing part 29 as an opening part is formed on the forward end step part 27 of the right side dashboard 22, and a base part of a joy-stick lever 30 is fixed to the loader lever fixing part 29.

As shown in FIG. 3, the forward end step part 27 is located on the position that is lower than the lower part surface 25, on which the position lever 31 is disposed, and is lower than the upper part surface 24, on which the PTO on and off lever 35 is disposed. And as shown in FIG. 2, the forward end step part 27 is disposed beside the steering wheel 20.

Since the forward end step part 27 is disposed on the position, it is possible to locate the joy-stick lever 30 so that the grip part of the joy-stick lever 30 is located in a suitable position when the operator sitting on the driver's seat 21 operates the joy-stick lever 30.

Since the joy-stick lever 30 is disposed on the forward end part of the right side dashboard 22 in the case of the tractor 10 according to the present Embodiment, it is not necessary to prepare additional parts as base members of the joy-stick lever, which are like the conventional support arm and support bracket.

As shown in FIGS. 5 and 6, a lock switch for joy-stick lever 28, which locks an operation of the joy-stick lever 28, is disposed on a position which is the forward end part of the right side dashboard 22 and the position below the forward end step part 27.

Since the joy-stick lever 30 can be locked by operating of the lock switch for joy-stick lever 28 when the operation of the joy-stick lever 30 is unnecessary, it is possible to prevent the front loader 14 from moving suddenly, even when the operator touches the joy-stick lever 30 carelessly.

Further, since the lock switch for joy-stick lever 28 is located at the position which is away from the operator and where the hand of the operator does not touch it, it is possible to prevent the operator from operating the lock switch for joy-stick lever 28 mistakenly.

By the way, the joy-stick lever 30 is one example of a loader lever of the present invention. The forward end step part 27 is one example of a step part of the present invention. The lock switch for joy-stick lever 28 is one example of a lock member of the present invention.

On the other hand, operation tools related to run operation are disposed between the driver's seat 21 and the right side dashboard 22.

A main change lever 40 is disposed at the position between the driver's seat 21 and the right side dashboard 22, where it is easy to operate the main change lever 40 by the right hand. A sub-change lever 41 is disposed at the rear side of the main change lever 40. The sub-change lever 41 is fixable at arbitrary positions, and it is possible to maintain the run speed of the tractor 10 constantly corresponding to the position of the sub-change lever 41.

As shown in FIG. 2, in order to secure the operation range of the main change lever 40, as for the top surface of the right side dashboard 22, a forward and inside part of the right side dashboard 22 is formed in a curve shape so that the width of the top surface becomes narrower along the forward direction. The position lever 31 is located along the curve shape.

As shown in FIG. 2, with reference to the driver's seat 21, the grip part of the position lever 31 is located at the outside position of the grip part of the main change lever 40, and the grip part of the joy-stick lever 30 is located at the front side position of the grip part of the main change lever 40.

According to the arrangement configuration of these levers, it is easy for the driver sitting on the driver's seat 21 to perform the operation of the work implement and the operation of the front loader 14 properly with reference to the main change lever 40.

By the way, the main change lever 40 is one example of a main change lever of the present invention.

The two chain lines h1 and h2 shown in FIG. 6 denote height of an upper end side and height of a lower end side of the steering wheel 20, respectively.

As shown in FIG. 6, the joy-stick lever 30 is constituted so that the position of the grip part thereof in the vertical direction is disposed between height of the upper end side and height of a lower end side of the steering wheel 20 (see reference symbol H in FIG. 6). Further, the grip part of the main change lever 40 is disposed at the position which is lower than the height of the lower end side of the steering wheel 20 (see reference symbol h2 in FIG. 6).

Further, as shown in FIG. 2, the joy-stick lever 30 is extended toward the inner side of the vehicle body so that the grip part thereof approaches toward the steering wheel 20 from the base part.

According to the above mentioned configuration, the joy-stick lever 30, which always needs to be gripped, is located closely to a side of the steering wheel 20 and is located in the front side of the operator's eyes, who is sitting on the driver's seat 21. Therefore, it is easy to operate the joy-stick lever 30, even when the operator drives the tractor 10.

On the other hand, since the grip part of the main change lever 40, which does not always need to be gripped, is located at the lower position beside the operator, the operator's hand rarely touches the grip part of the main change lever 40 carelessly.

An accelerator pedal 49 is disposed on the floor which is in front of the right hand side of the driver's seat 21.

A 4-wheel drive lever 43 is disposed on the right side of the driver's seat 21, and a differential lock pedal 44 is disposed below the right side end of the driver's seat 21. When the 4-wheel drive lever 43 is pulled up, the mode changes to the 2-wheel drive mode, and when the 4-wheel drive lever 43 is pushed down, it changes to the 4-wheel drive mode.

Since the 4-wheel drive lever 43 is disposed at the position near to the right side of the driver's seat 21, it is easy for the operator sitting on the driver's seat 21 to operate the 4-wheel drive lever 43 in comparison with the conventional tractor in which the 4-wheel drive lever is disposed at the position near to the floor surface.

By the way, in the above mentioned configuration, the 4-wheel drive lever 43 is a lever of form extended upward. However, for instance, another configuration of the 4-wheel drive lever 43 can have a lever of form extended forward and the lever can be disposed on the surface which stands up perpendicularly from the floor surface below the driver's seat 21. In the case of this configuration, for instance, when the 4-wheel drive lever 43 is leaned up, the mode changes to the 2-wheel drive mode, and when the 4-wheel drive lever 43 is leaned down, it changes to the 4-wheel drive mode.

As shown in FIG. 4, a center horn 51 is located at the center portion of the steering wheel 20. A forward-reverse lever 45 is disposed in the left hand depths of the steering wheel 20 and a blinker lever 52 is disposed in the right hand depths of the steering wheel 20, with respect to the operator sitting on the driver's seat 21. A throttle lever 46 is disposed in front of the right side of the steering wheel 20, and a hazard switch 50 is disposed in front of the left side of the steering wheel 20.

A pair of right and left brake pedals 48 is disposed at the position near to the floor part which is in front of the right side part of the driver's seat 21, and a clutch pedal 47 is disposed at the position near the floor part which is in front of the left side part of the driver's seat 21. A tilt pedal 55 is disposed at the position near the floor part which is below the left side part of the steering wheel 20.

The tractor 10 according to the present Embodiment has a configuration in which the joy-stick lever 30 is detachably connected to the loader lever fixing part 29 of the forward end step part 27.

Figure 7A:
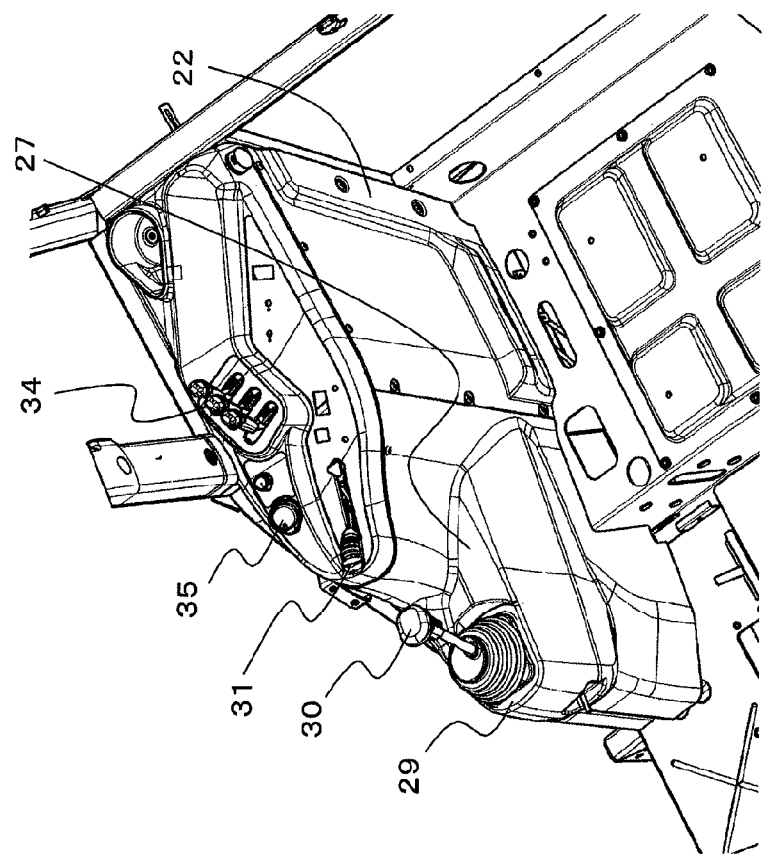
FIG. 7(a) is a perspective view seen from the left fore side of a right side dashboard portion of the tractor for the agriculture use, which is provided with a front loader, according to the Embodiment of the present invention.
Figure 7B:
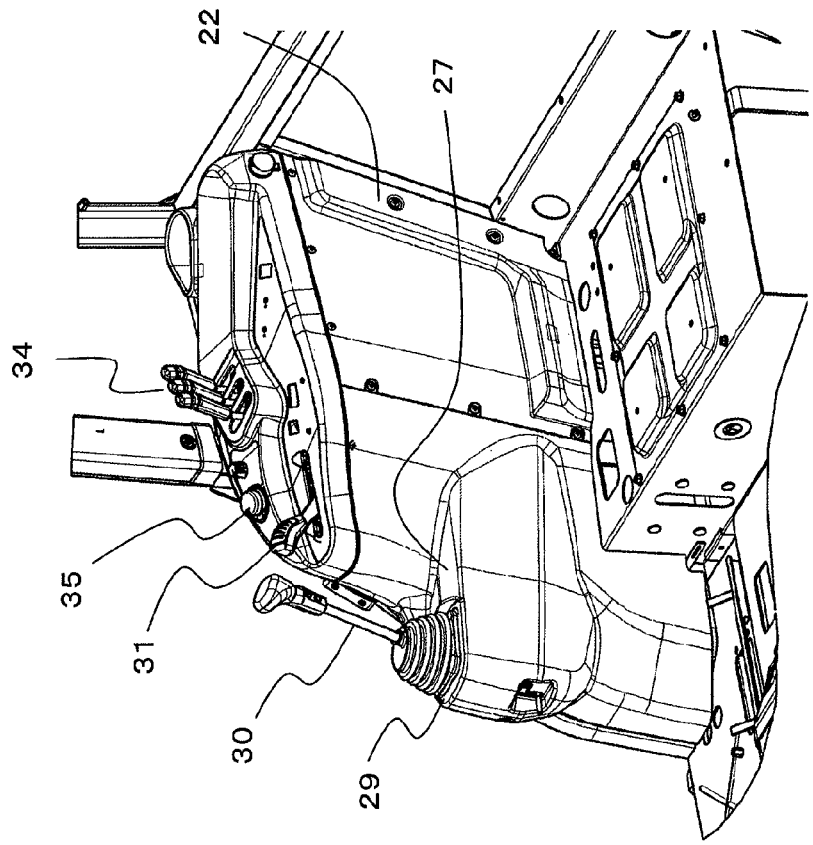
FIG. 7(b) is a perspective view seen from the left fore side of the right side dashboard portion of the tractor for the agriculture use, which is provided with a front loader, according to the Embodiment of the present invention.

Each of FIGS. 7(a) and 7(b) shows a perspective view seen from the left fore side of a portion of the right side dashboard 22 of the tractor 10 which is provided with the front loader 14.

Figure 8A:
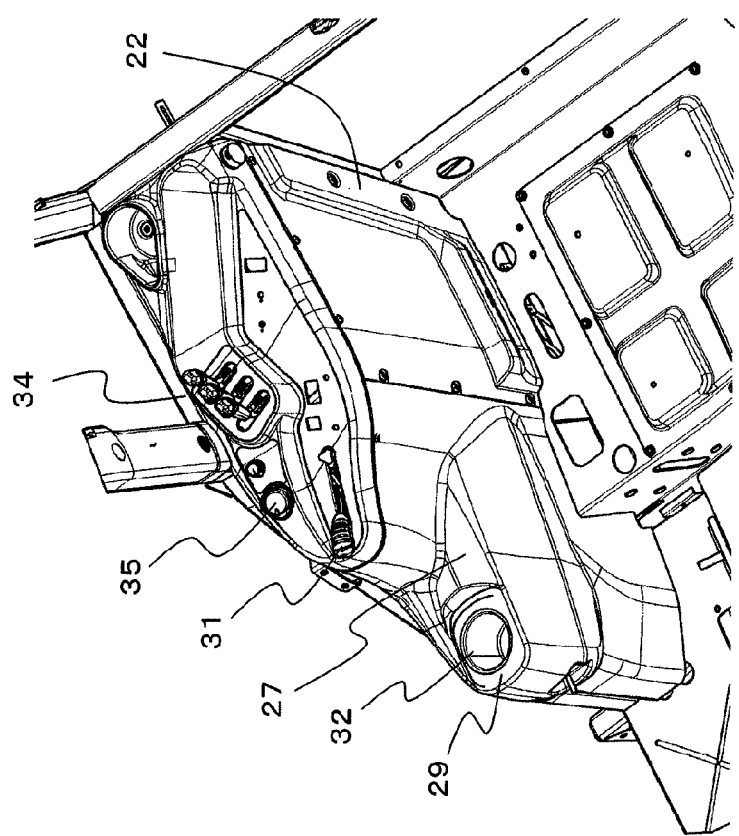
FIG. 8(a) is a perspective view seen from the left fore side of a right side dashboard portion of the tractor for the agriculture use, which is not provided with a front loader, according to the Embodiment of the present invention.
Figure 8B:
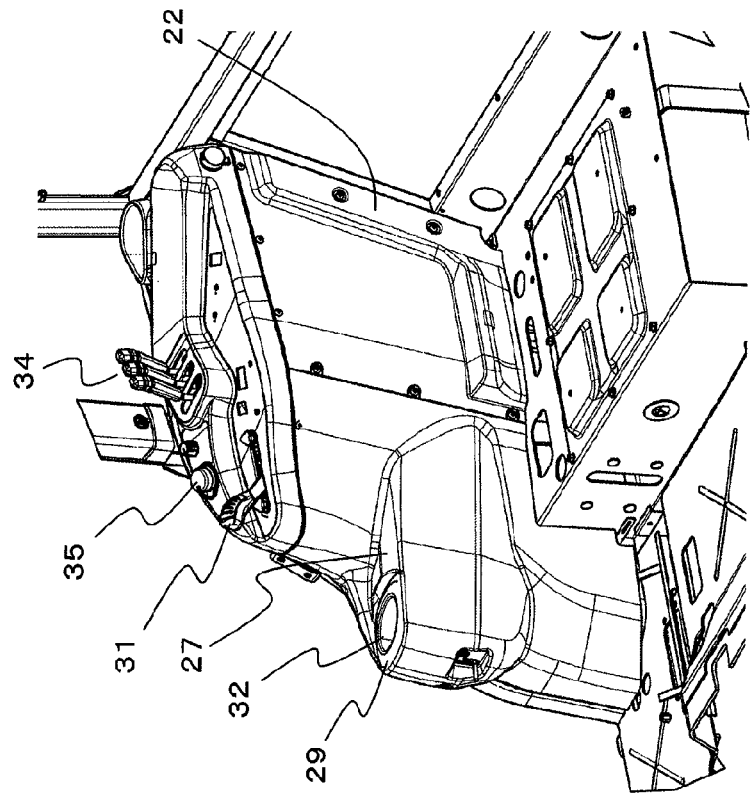
FIG. 8(b) is a perspective view seen from the left fore side of the right side dashboard portion of the tractor for the agriculture use, which is not provided with a front loader, according to the Embodiment of the present invention.
Figure 9:
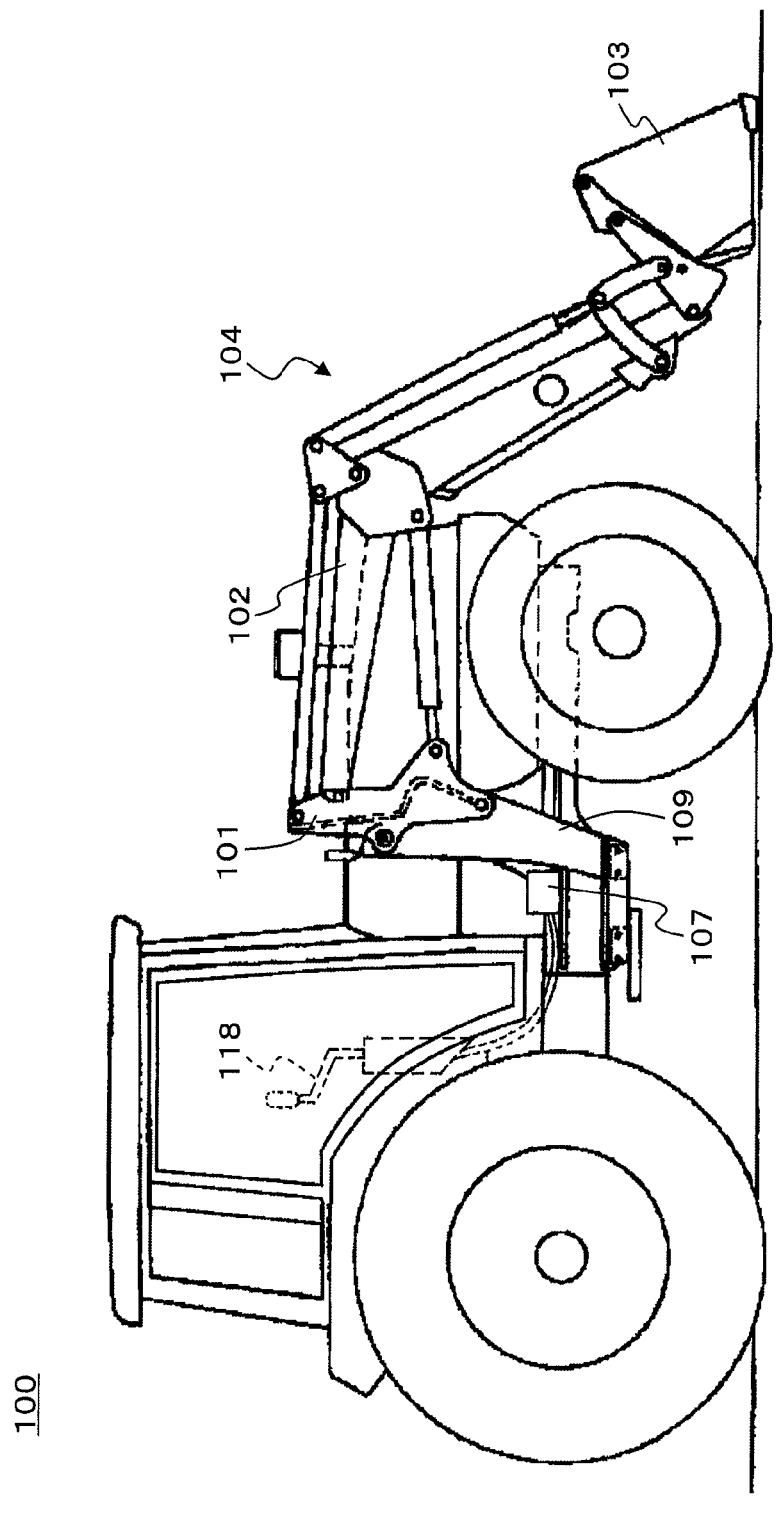
FIG. 9 is a whole right side view seen from the right side of a conventional loader-working vehicle.
Figure 10:
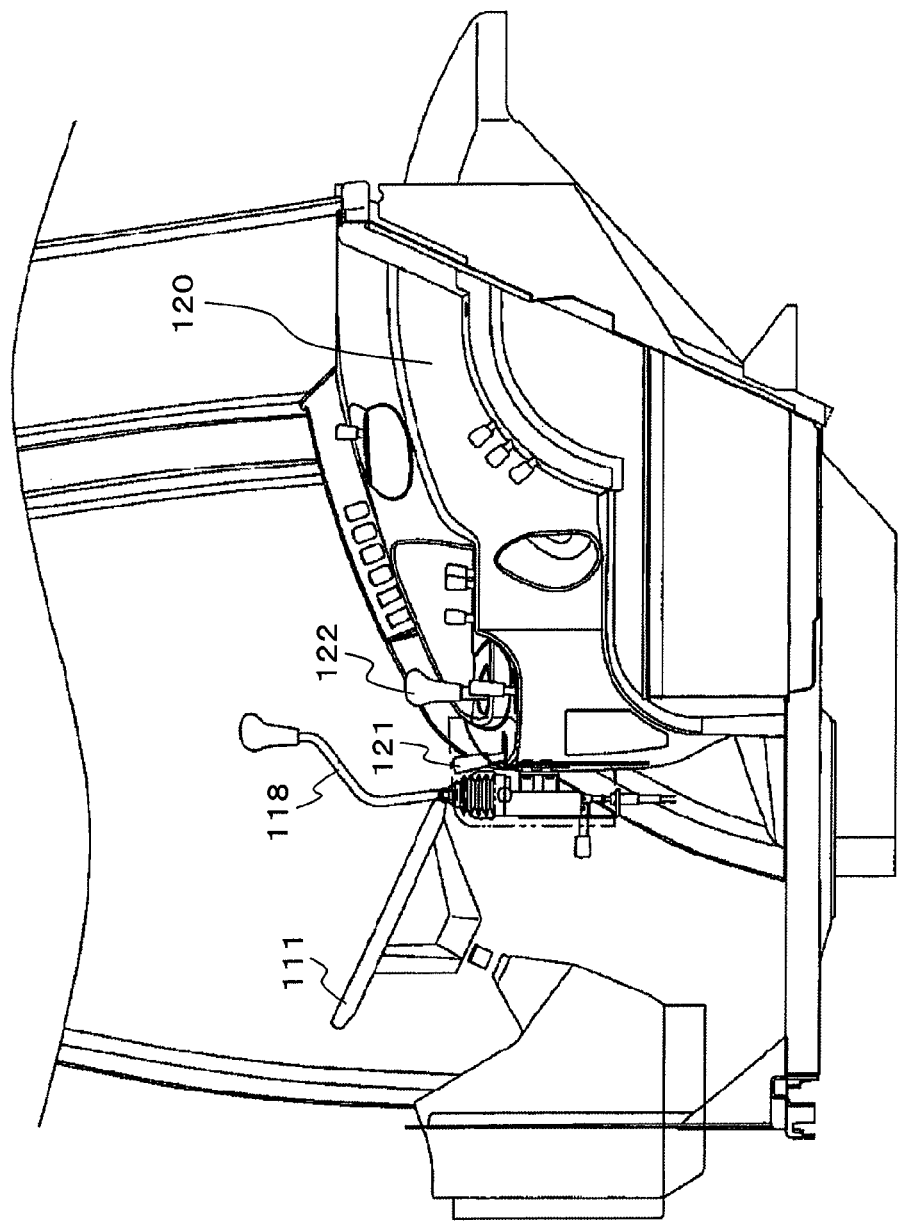
FIG. 10 is a left side view seen from the left side of an inside of a cabin of the conventional loader-working vehicle.

Each of FIGS. 8(a) and 8(b) shows a perspective view seen from the left fore side of a portion of a right side dashboard 22 of the tractor 10 which is not provided with the front loader 14.

FIG. 7(b) and FIG. 8(b) show the perspective views seen from higher position than FIG. 7(a) and FIG. 8(a) respectively.

As shown in FIGS. 7(a) and 7(b), in the case of the tractor 10 which is provided with the front loader 14, the base part of the joy-stick lever 30 is fixed to the loader lever fixing part 29 as an opening part which is located on the forward end step part 27 of the right side dashboard 22.

In the case of the tractor 10 which is not provided with the front loader 14, the joy-stick lever 30 is removed from the loader lever fixing part 29 because the joy-stick lever 30 is unnecessary.

As shown in FIGS. 8(a) and 8(b), a hold part 32 can be attached to the opening part where the joy-stick lever 30 has been removed from the loader lever fixing part 29.

A concave portion, which holds a cup for drink and the like stably, is formed upward.

The forward end step part 27 is formed at the position where the operator can touch it by the right hand when the operator sits on the driver's seat 21. It is possible to put the cup for drink to the position where it is easy for the operator to take the cup, because a hold part 32 is located on the forward end step part 27.

Since the hold part 32 is located on the forward end step part 27, the cup for drink does not become an obstacle to the operation by the operator, even if it is put onto the hold part 32.

As described above, it is easy to locate any one of the joy-stick lever 30 and the hold part 32 by the configuration having the opening part as the loader lever fixing part 29.

The working vehicle of the present invention has an effect that the operation of the front loader thereof is easier than the conventional working vehicle, even when the operator drives the working vehicle, and can be effectively applied to a working vehicle, to which a loader is attached, for an agriculture use, a construction use, a transportation use and the like.

DESCRIPTION OF SYMBOLS 10 tractor
11 front wheel
12 rear wheel
13 bonnet
14 front loader
15 bucket
16 main frame
17 cylinder for pivotable bucket
18 cylinder for pivotable main frame
19 side frame
20 steering wheel
21 driver's seat
22 right side dashboard
24 upper part surface
25 lower part surface
26 arm rest
27 forward end step part 28 lock switch for joy-stick lever
29 loader lever fixing part
30 joy-stick lever
31 position lever
32 hold part
33 depth control dial
34 external oil pressure lever
35 PTO on/off switch
37 adjustment dial of descent limit position
38 adjustment dial of ascent limit position
40 main change lever
41 sub-change lever
43 4-wheel drive lever
44 differential lock pedal
45 forward-reverse lever
46 throttle lever
47 clutch pedal
48 brake pedal
49 accelerator pedal
50 hazard switch
51 center horn
52 blinker lever
55 tilt pedal
100 loader-working vehicle
101 side frame
102 boom
103 bucket
104 front loader
107 control valve
109 mast
111 steering wheel
117 control box
118 loader lever
120 vertical wall part
121 sub-change lever
122 main change lever

What is claimed is:

1. A working vehicle, comprising:
a driver's seat;
a steering wheel;
a work implement lifting lever which performs an operation for lifting or lowering a work implement;
a power takeoff (PTO) on-off member which turns on and off a PTO;
a loader lever which operates a loader;
a main change lever which changes a running speed of the working vehicle;
a sub-change lever;
an operation panel located at one side of the driver's seat, and
an arm rest located at another side of the driver's seat, wherein
a step part is located at a forehand side of the operation panel, the step part being lower than a top surface of the operation panel,
the work implement lifting lever and the PTO on-off member are located on the operation panel,
the step part is located beside the steering wheel, and is provided with the loader lever,
the main change lever and the sub-change lever, which is disposed behind the main change lever, are located between the operation panel and the driver's seat,
a grip part of the main change lever is disposed at a lower position than the steering wheel,
a grip part of the work implement lifting lever is disposed at an outside position of the grip part of the main change lever on a plan view,
a grip part of the loader lever is disposed at a front side position of the grip part of the main change lever on a plan view, and is disposed between a height of an upper end side of the steering wheel and a height of a lower end side of the steering wheel on a side view,
the operation panel is provided with an upper part surface which is formed on an outside part of the top surface of the operation panel, and a lower part surface which is formed on an inside part of the top surface of the operation panel, the upper part surface being disposed at a position which is far from the driver's seat, in comparison with the lower part surface with respect to right and left directions of the working vehicle,
the PTO on-off member is disposed on the upper part surface of the operation panel and the work implement lifting lever is disposed on the lower part surface of the operation panel,
the lower part surface of the operation panel is configured so that a width of the lower part surface becomes narrower along a forward direction,
the grip part of the main change lever is opposite a side wall surface extended downward from a portion of the lower part surface of the operation panel which has the narrow width, and
an operation range of the work implement lifting lever is located on the portion of the lower part surface of the operation panel which has the narrow width.

2. The working vehicle according to claim 1,
wherein a lock member which locks an operation of the loader lever is disposed in front of and below the step part.

* * * * *